Z. W. GREEN, Sr. & Z. W. GREEN, Jr.
PEANUT HARVESTER.
APPLICATION FILED MAY 25, 1917.
1,264,294.
Patented Apr. 30, 1918.
4 SHEETS—SHEET 1.
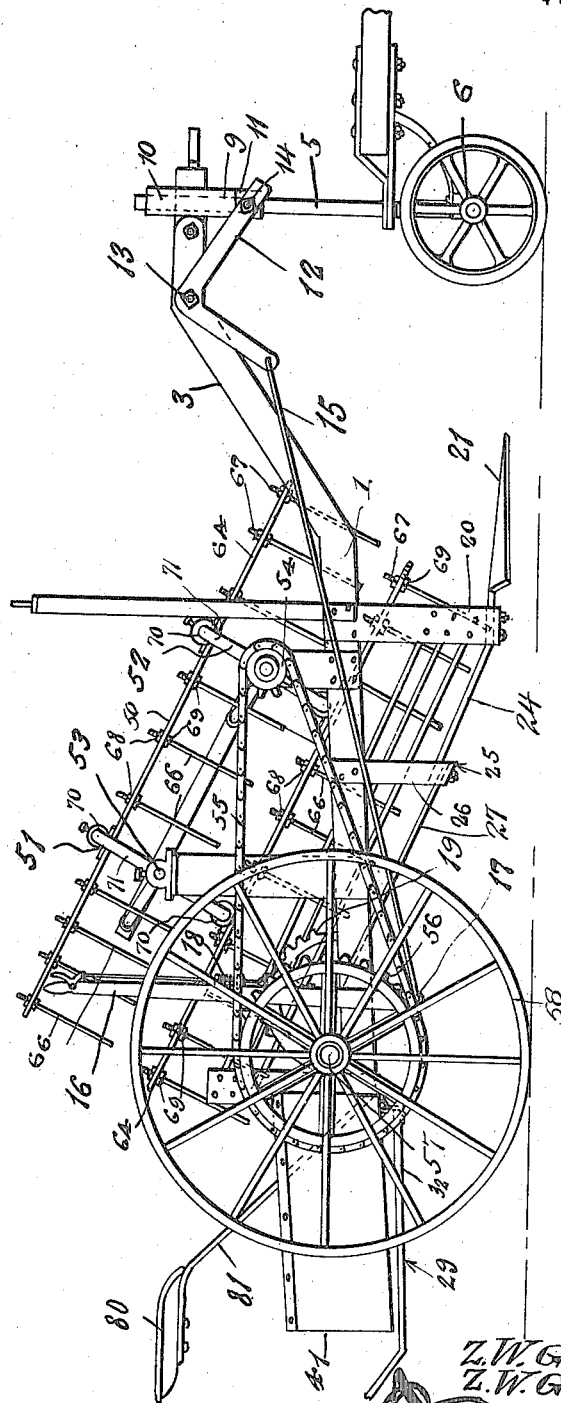

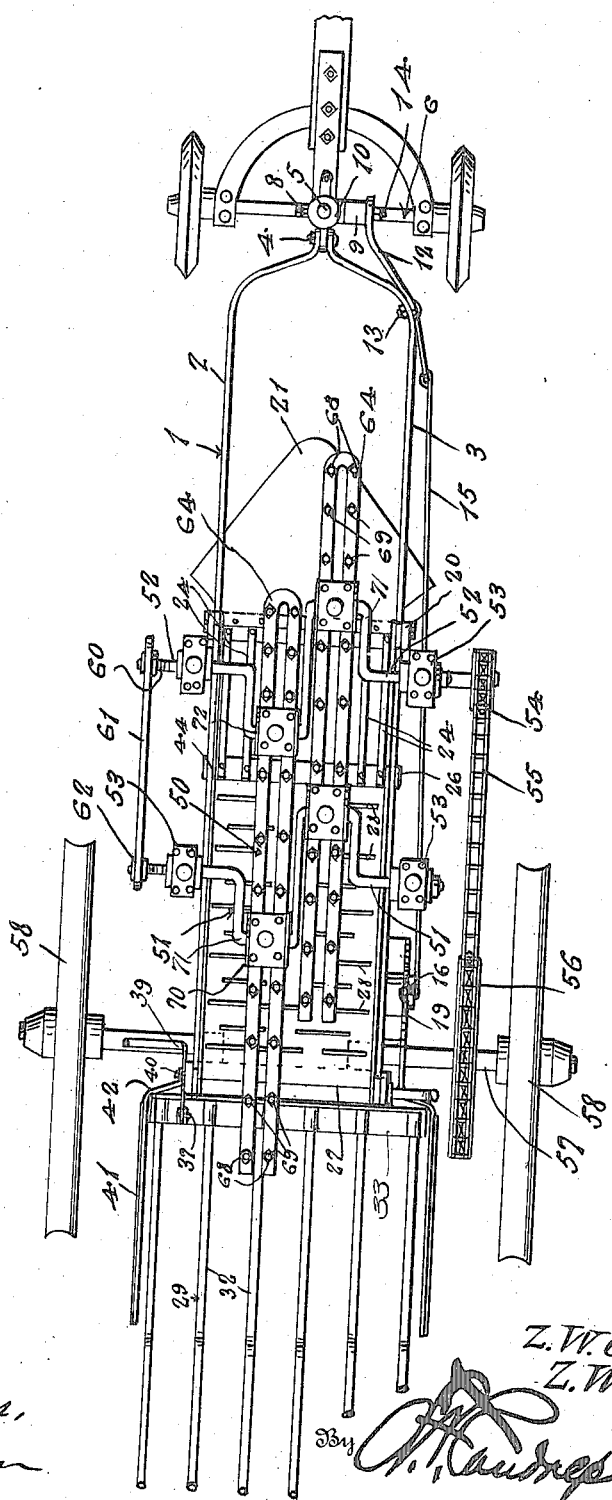

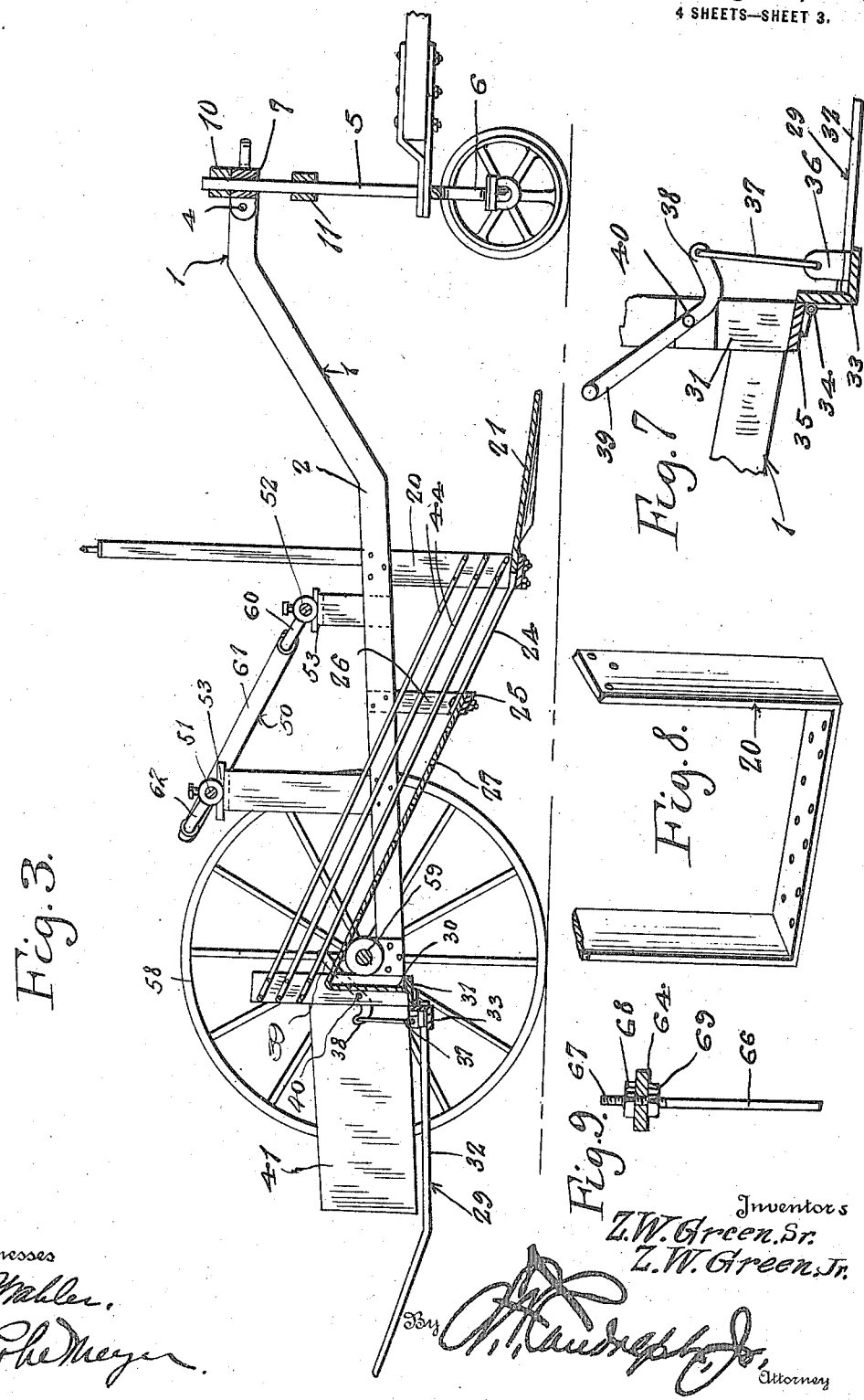

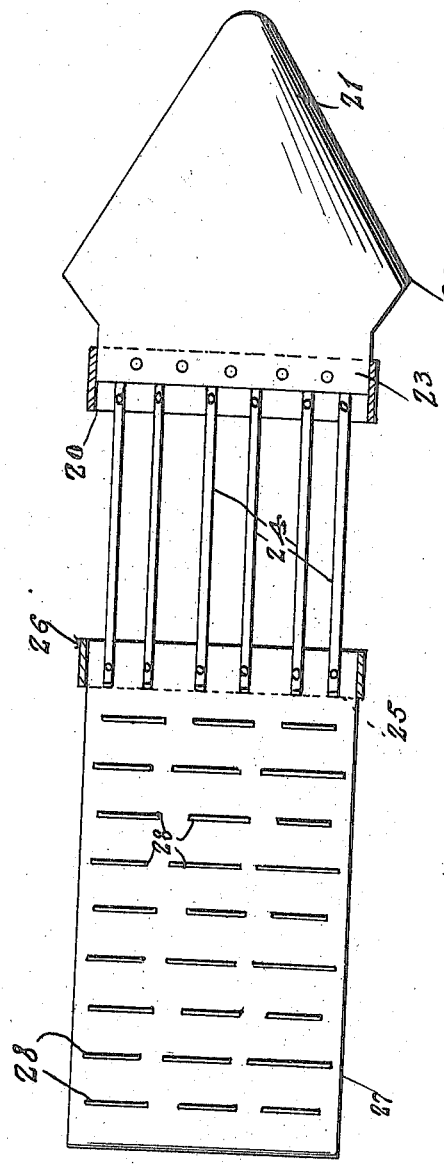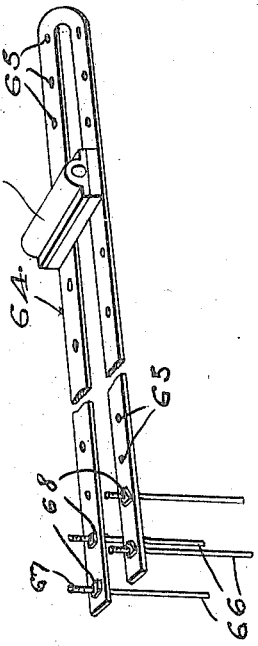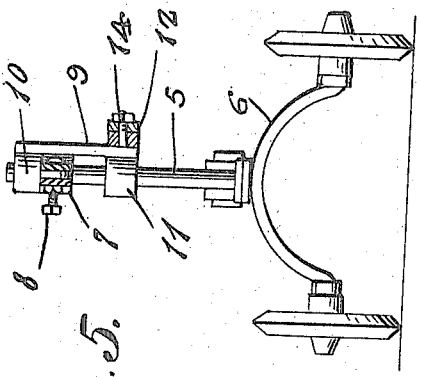

UNITED STATES PATENT OFFICE.

ZEDEKIAH W. GREEN, SR., AND ZEDEKIAH W. GREEN, JR., OF SABANNO, TEXAS.

PEANUT-HARVESTER.

1,264,294.

Specification of Letters Patent.

Patented Apr. 30, 1918.

Application filed May 25, 1917. Serial No. 171,055.

*To all whom it may concern:*

Be it known that we, (1) ZEDEKIAH W. GREEN, Sr., (2) ZEDEKIAH W. GREEN, Jr., citizens of the United States, residing at Sabanno, in the county of Eastland, and State of Texas, have invented certain new and useful Improvements in Peanut-Harvesters; and we do hereby declare the following to be a full, clear, and exact description of the invention, such as will enable others skilled in the art to which it appertains to make and use the same.

This invention relates to a machine for harvesting peanuts, potatoes or analogous agricultural products, and the primary object of the invention is to provide a machine which will uproot the peanut plants, and carry them upwardly over a perforated plate, whereby the dirt will be separated from the plant, and the plant deposited upon a carrier, from which they may be dumped in piles as desired.

Another object of this invention is to provide a peanut harvester as specified, which includes a supporting frame having a perforated plate supported thereby at an incline, and a plurality of rods connected to the lower forward end of the perforated plate in spaced relation to each other and extending downwardly to the delivery end of an uprooting plow whereby the plants uprooted by the plow will be forced upwardly over the rods, and further to provide a novel carrier structure for carrying the plants upwardly over the inclined perforated plate.

Another object of this invention is to provide a carrier structure as specified, which includes a pair of crank shafts having a pair of substantially U-shaped horizontally positioned frames carried thereby, to which frames are secured in spaced relation, a plurality of plant engaging tines so that upon the rotation of the crank shaft, the tines will engage the plants and carry them upwardly over the upper surface of the perforated plate and deposit them upon a carrier.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of the improved peanut harvester;

Fig. 2 is a top plan view of the harvester;

Fig. 3 is a longitudinal section through the harvester;

Fig. 4 is a fragmentary horizontal section showing the uprooting plow, spaced rods and perforated plate over which the plants travel;

Fig. 5 is a detail view of a part of the frame construction of the harvester;

Fig. 6 is a detail perspective view of one of the U-shaped supporting plates of the carrier structure;

Fig. 7 is a detail sectional view illustrating the manner of supporting and dumping the carrier structure;

Fig. 8 is a detail perspective view of a part of the frame structure; and

Fig. 9 is a sectional view illustrating the manner of connecting the tines to the U-shaped supporting frames of the carrier.

Referring more particularly to the drawings, 1 indicates the main supporting frame of the harvester, which is composed of side rails 2 and 3. The side rails 2 and 3 have their forward ends bent inwardly and secured to an ear 4. The ear 4 is supported by a standard 5. The standard 5 is rigidly carried by the front truck structure 6. The front truck structure is of any desired ordinary construction, and the standard 5 has a collar 7 mounted thereon and held in place by a set screw 8. The ear 4 is carried by a supplemental frame structure 9 which has a pair of collars 10 and 11 formed upon the upper and lower ends respectively of the same which collars are positioned upon opposite sides of the collar 7 as clearly shown in Fig. 5 of the drawings. An angled bar 12 is pivotally connected as shown at 13 to the frame 3 and it is connected to the frame 9 as shown at 14. A rod 15 is connected to the rearwardly extending portion of the angled bar 12 and to the lower end of a hand lever 16, as shown at 17. The hand lever 16 is pivotally carried by the supporting frame 1 and it has a dog mechanism 18 carried thereby which coacts with a quadrant 19 for holding the hand lever in various adjusted positions. The hand lever 16 is provided for rocking the bell crank or angled lever 12, for raising or lowering the position of the front end of the frame 1 with respect to the front truck section 6.

A U-shaped hanger 20 is secured to the supporting frame 1, rearwardly of the front truck structure 6 and it has an uprooting plow 21 attached thereto and extending forwardly therefrom. The plow 21 has its front end pointed, as clearly shown in Figs. 2 and 4 of the drawings, for properly uprooting the peanut plants, and its sides diverge, as they extend rearwardly, terminating in points 22 which are positioned short distances forwardly of the attaching portion 23 of the shovel which is attached to the bight portion of the U-shaped member 20.

A plurality of rods 24 are attached to the bight portion of the U-shaped hanger 20 in spaced relation, and they extend rearwardly and upwardly from the hanger 20 and have their upper rear ends attached to the bight portion 25 of the U-shaped hanger 26. A flat pan or plate 27 has its forward edge attached to the bight portion 25 of the U-shaped hanger 26 and it is provided with a plurality of perforations 28 provided for allowing the dirt to fall therethrough, so that the plants will be carried over the plates and be practically cleaned of dirt, when they are deposited upon the carrier structure 29.

The rearmost portion of the plate 27 is bent downwardly, as shown at 30, and the lower edge thereof rests upon the bight portion of a substantially U-shaped supporting structure 31.

The carrier structure 29, comprises a plurality of spaced rods 32 which have their forward ends secured to an angle iron 33. The angle iron 33 is hingedly connected as shown at 34 to the bight portion 35 of the U-shaped supporting bracket 31. An ear 36 is connected to the angle iron 33 and it has a rod 37 connected thereto which rod is connected to the upturned end 38 of a foot lever 39. The foot lever 39 is pivotally mounted at 40, so that when the foot lever is forced rearwardly, the carrier structure will be lowered, for dumping the plants carried thereby upon the ground. Guards 41 which are constructed of plates of sheet metal are attached to the supporting frame 1 and bent outwardly as shown at 42, so that they will extend longitudinally along the outer sides of the carrier structure for preventing the plants from falling off the sides of the carrier.

A plurality of rods 44 are attached to the upstanding legs of the U-shaped hanger 20 and the U-shaped brackets 31, along the sides of the plate 27 and they prevent the plants from falling off the sides of this plate during their travel thereover.

The plants are carried upwardly over the plate 27, by a carrier structure generically indicated by the numeral 50. The carrier structure 50 comprises a pair of crank shafts 51 and 52, which are supported by suitable bearings 53. The crank shaft 52 has a sprocket 54 mounted thereon about which a sprocket chain 55 travels. The sprocket chain 55 also travels about a sprocket 56 which is carried by the rear axle 57 of the harvester, upon which the usual type of supporting wheels 58 are mounted. The axle 57 is supported by suitable bearings 59 which are attached to the upper surface of the side rails 2 and 3 of the supporting frame 1 adjacent their rear end.

The crank shaft 52 has a crank 60 formed thereon, with which a crank pin 61 is connected. The crank pin 61 is connected to a crank 62 carried by the crank shaft 51, so that the crank shaft 51 will be rotated by the rotation of the crank shaft 52. The crank shafts 51 and 52 have a pair of substantially U-shaped supporting structures 64 carried thereby which are constructed of flat metal bars bent intermediate their ends to form substantially U-shaped members, the legs of which lie parallel to each other and in a horizontal plane. The legs of the U-shaped member 64 are provided with a plurality of perforations 65, through which fingers or tines 66 extend. The fingers or tines 66 have their upper ends screw threaded as shown at 67, and nuts 68 and 69 are mounted thereon upon opposite sides of the bar 64 for adjustably connecting the tines to the U-shaped bar. The U-shaped bars have bearings 70 carried thereby which are connected to the wrists of the crank portions 71 and 72 of the shafts 51 and 52 respectively so that during the rotation of the shafts, the members 64 will be moved longitudinally over the plate 27 and in a swinging movement in a substantially oval path, for carrying the peanut plants upwardly over the plate 27. The action of the carrier structure 50 will tend to shake the dirt from the peanut plants, which dirt will fall downwardly through the openings 28 formed in the plate 27.

In the operation of the improved peanut harvester:

The position of the uprooting plow 21, and the front end of the frame is regulated by the operation of the hand lever 16, and the uprooting shovel 21 will uproot the peanut or potato plants, and carry them upwardly onto the rods 24 which will allow the large particles of dirt to fall downwardly therebetween, freeing the plants of these large clods. The forward travel of the harvester will force the peanut plants upwardly over the rods 24 onto the plate or pan 27, and this upward movement will be further facilitated by the operation of the carrier structure 50. The bight portions of the U-shaped members 64 extend forwardly far enough to engage the plants as they are uprooted by the plow or shovel 21. The plants will be carried upwardly over the plate 27, by the carrier structure, and deposited off the upper rear end of the plate upon the carrier structure 49, from which they may be dumped when desired, by the operation of the foot trip 39. A seat 80, of the ordinary construction employed in agricultural implements, which is supported by a spring standard 81 may be provided if desired.

From the foregoing description taken in connection with the accompanying drawings, the advantages of construction and of the method of operation of the improved peanut harvester, will be readily apparent to those skilled in the art to which this invention appertains, and, while in the foregoing description, the principle of the operation of this invention has been described together with various features of construction, it will be understood that certain minor features of construction, combination and arrangement of parts may be altered to suit practical conditions provided such alterations are comprehended within the scope of what is claimed.

What is claimed is:—

1. In a peanut harvester, the combination, of a supporting frame, a plurality of U-shaped supporting brackets carried by said supporting frame, an uprooting plow carried by the foremost of said U-shaped brackets, a perforated plate attached to certain of said U-shaped brackets, and a plurality of spaced rods attached to the foremost of said U-shaped brackets and extending rearwardly to the forward edge of said perforated plate, said rods being spaced to allow dirt to fall therebetween.

2. In a peanut harvester, a supporting frame, a plurality of U-shaped brackets carried by said frames, a perforated plate carried by certain of said U-shaped brackets, a plurality of spaced rods carried by certain of said U-shaped brackets and extending forwardly and downwardly from the forward end of said plate, uprooting means positioned forwardly of the forward ends of said rods, a plurality of crank shafts rotatably supported by said supporting structure, and means carried by said crank shafts for engaging plants and carrying them upwardly over said rods and plate.

3. In a peanut harvester, a supporting frame, an inclined perforated plate carried by said supporting frame, a plurality of crank shafts rotatably carried by the supporting frame, uprooting means for uprooting peanuts and guiding them to said inclined perforated plates, a plurality of substantially U-shaped bars carried by the cranks of said crank shafts, and a plurality of depending tines adjustably carried by said U-shaped bars for movement over said perforated plate upon rotation of the crank shafts for carrying the plants upwardly over the plate.

4. In a peanut harvester, a carrier structure comprising a plurality of substantially U-shaped bars, and a plurality of tines adjustably carried by said bars and extending at right angles thereto.

5. In a peanut harvester, a carrier structure comprising a pair of crank shafts, means operatively connected to one of said crank shafts for rotating the shaft, a crank formed upon one end of said last mentioned crank shaft, a pitman connected to said last named crank and to the other of said crank shafts for rotating the second crank shaft by the rotation of the crank shaft, a plurality of U-shaped members carried by said crank shafts, and a plurality of tines adjustably connected to said U-shaped members and extending at right angles therefrom.

In testimony whereof we affix our signatures in presence of two witnesses.

ZEDEKIAH W. GREEN, Sr.
ZEDEKIAH W. GREEN, Jr.

Witnesses:
C. C. Web,
C. R. Wagner.